(12) United States Patent
Faust

(10) Patent No.: US 8,690,716 B2
(45) Date of Patent: Apr. 8, 2014

(54) BELT-DRIVEN CONICAL-PULLEY TRANSMISSION AND MOTOR VEHICLE WITH SUCH A TRANSMISSION

(75) Inventor: Hartmut Faust, Bühl (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 1337 days.

(21) Appl. No.: 11/891,634

(22) Filed: Aug. 11, 2007

(65) Prior Publication Data

US 2008/0035409 A1   Feb. 14, 2008

Related U.S. Application Data

(60) Provisional application No. 60/845,714, filed on Sep. 19, 2006.

(30) Foreign Application Priority Data

Aug. 12, 2006 (DE) .......................... 10 2006 037 842

(51) Int. Cl.
  *F16H 59/00* (2006.01)
  *F16H 61/00* (2006.01)
  *F16H 63/00* (2006.01)

(52) U.S. Cl.
  USPC .......................................................... 474/28

(58) Field of Classification Search
  USPC .................................. 474/8, 18, 28
  See application file for complete search history.

(56) References Cited

U.S. PATENT DOCUMENTS

| | | | | |
|---|---|---|---|---|
| 3,280,649 A * | 10/1966 | Bruet | .............. | 474/28 |
| 3,600,960 A * | 8/1971 | Karig et al. | .............. | 474/12 |
| 4,504,251 A * | 3/1985 | Mittermeier | .............. | 474/110 |
| 4,772,247 A * | 9/1988 | Stockton | .............. | 474/8 |
| 5,030,169 A * | 7/1991 | Kiso et al. | .............. | 474/110 |
| 5,295,915 A * | 3/1994 | Friedmann | .............. | 474/18 |
| 5,766,105 A * | 6/1998 | Fellows et al. | .............. | 474/18 |
| 5,776,022 A * | 7/1998 | Schellekens | .............. | 474/18 |
| 5,813,933 A * | 9/1998 | Tsukamoto et al. | .............. | 474/11 |
| 6,123,634 A * | 9/2000 | Faust et al. | .............. | 474/8 |
| 6,174,253 B1 * | 1/2001 | Walter et al. | .............. | 474/18 |
| 6,186,917 B1 * | 2/2001 | Friedmann et al. | .............. | 474/18 |
| 6,190,274 B1 * | 2/2001 | Walter | .............. | 474/28 |
| 6,241,635 B1 * | 6/2001 | Schmid et al. | .............. | 474/11 |
| 6,277,043 B1 * | 8/2001 | Friedmann | .............. | 474/18 |
| 6,342,024 B1 * | 1/2002 | Walter et al. | .............. | 475/210 |
| 6,361,456 B1 * | 3/2002 | Walter | .............. | 474/18 |
| 6,585,613 B1 * | 7/2003 | Walter et al. | .............. | 474/8 |
| 6,997,834 B2 * | 2/2006 | Vorndran et al. | .............. | 474/28 |
| 7,048,657 B2 * | 5/2006 | Faust et al. | .............. | 474/18 |

(Continued)

*Primary Examiner* — William A Rivera
*Assistant Examiner* — Henry Liu
(74) *Attorney, Agent, or Firm* — Alfred J. Mangels

(57) ABSTRACT

Conical disk pairs of a belt-driven conical-pulley transmission include an axially fixed disk and an axially movable disk that are situated on respective shafts on the input side and the output side and are connectable by an endless torque-transmitting component for transmitting torque. At least one of the shafts has at least one axial bore from which at least one connecting bore extends to the surface of the shaft. The outlet of the connecting bore is in a region that is covered by the movable disk independent of the latter's axial position. An annular chamber formed between the shaft outer surface and a radially inner surface of the axially movable disk can be subjected to hydraulic pressure through the connecting bore. A discharge groove is provided for bleeding air bubbles from the annular chamber.

10 Claims, 4 Drawing Sheets

(56) References Cited

U.S. PATENT DOCUMENTS

| | | | |
|---|---|---|---|
| 7,131,921 B2* | 11/2006 | Walter et al. | 474/8 |
| 7,264,564 B2* | 9/2007 | Walter | 474/28 |
| 2003/0013566 A1* | 1/2003 | Vorndran et al. | 474/18 |
| 2005/0192132 A1* | 9/2005 | Faust et al. | 474/18 |
| 2005/0192697 A1* | 9/2005 | Walter | 700/116 |
| 2007/0155550 A1* | 7/2007 | Faust | 474/8 |

* cited by examiner

BELT-DRIVEN CONICAL-PULLEY TRANSMISSION AND MOTOR VEHICLE WITH SUCH A TRANSMISSION

FIELD OF THE INVENTION

The present invention relates to a belt-driven conical-pulley transmission and to a vehicle equipped therewith.

DESCRIPTION OF THE RELATED ART

Belt-driven conical-pulley transmissions are enjoying growing popularity, not only because of the great convenience that is possible through the continuously variable, automatically occurring change of transmission ratio, but also because of the reduction of fuel consumption that is possible with them compared to manually shifted transmissions or to other automatic transmissions, especially in passenger cars.

Such continuously variable automatic transmissions have, for example, a start-up unit, a reversing planetary gearbox as the forward/reverse drive unit, a hydraulic pump, a variable speed drive unit, an intermediate shaft, and a differential. The variable speed drive unit includes two pairs of conical disks and an encircling component. Each conical disk pair includes an axially fixed first conical disk and a second conical disk that is movable in the axial direction. Between the pairs of conical disks runs the encircling component, for example a steel thrust belt, a tension chain, or a drive belt. Moving the second conical disk axially changes the running radius of the encircling component, and thereby the transmission ratio of the continuously variable automatic transmission.

Continuously variable automatic transmissions require a high level of pressure in order to be able to move the conical disks of the variable speed drive unit with the desired speed at all operating points, and also to transmit the torque with sufficient basic contact pressure with minimum wear.

An object of the present invention is to provide a belt-driven conical-pulley transmission that at high structural durability is economical to produce, and has a long operating life.

SUMMARY OF THE INVENTION

In accordance with the present invention the object is achieved with a belt-driven conical-pulley transmission having a conical disk pair on the input side and also a conical disk pair on the power output side, each disk pair including an axially fixed disk and an axially movable disk. The disks are positioned on respective shafts on the input side and on the output side and are drivingly connected by an endless torque-transmitting means for transmitting torque therebetween. At least one of the shafts has at least one axial bore extending in the longitudinal direction of the shaft, from which at least one connecting bore extends to the surface of the shaft. The outlet of the connecting bore is situated on the shaft surface in a region that is covered by the movable disk, regardless of the latter's axial position. An annular chamber is formed between the outer surface of the shaft and a radially interior surface of the axially movable disk, which chamber can be subjected to hydraulic pressure through the connecting bore, with one or more discharge devices for bleeding air bubbles from the annular chamber.

The connecting bore that opens at the outer surface of the shaft enables an axially short configuration of the axial bore, which is cost-effective and enables an axial shortening. The discharge device helps air bubbles that are present in the annular chamber to escape, so that the formation of fretting corrosion on a sliding seat of the movable disk can be reduced or entirely prevented.

Advantageously, the movable disk is non-rotatably connected to the shaft with an axially movable connection through axial teeth, and the teeth are located in the region of the annular chamber.

In addition, the belt-driven conical-pulley transmission is preferably designed in such a way that the outlet of the connecting bore at the shaft outer surface is situated in the region of the teeth, and the discharge device is formed by an axial groove that extends from the connecting bore outlet and whose bottom is recessed in relation to the outer surface of the shaft.

Preferably, the teeth are absent in the region of the axial groove and the outlet of the connecting bore.

The discharge device can be formed by a discharge bore that extends from the annular chamber at an axial distance from the outlet of the connecting bore, and that opens into the axial bore.

A circumferential groove can extend from the outlet of the discharge bore, with its bottom recessed relative to the outer surface of the shaft.

In an advantageous embodiment of the belt-driven conical-pulley transmission in accordance with the present invention, the annular chamber is sealed off on one side by a seal situated between the shaft and an axial flange of the movable disk, and the discharge device is situated in the annular chamber between the seal and the outlet of the connecting bore.

It can be advantageous if the annular chamber is sealed off on both sides by seals situated between the shaft and an axial flange of the movable disk, and the discharge device is situated in the annular chamber between the seals and the outlet of the connecting bore.

In addition, a connecting channel that leads through the movable disk advantageously extends from the annular chamber on its side away from the seal relative to the connecting bore, into a pressure chamber to apply hydraulic pressure to the axially movable disk.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
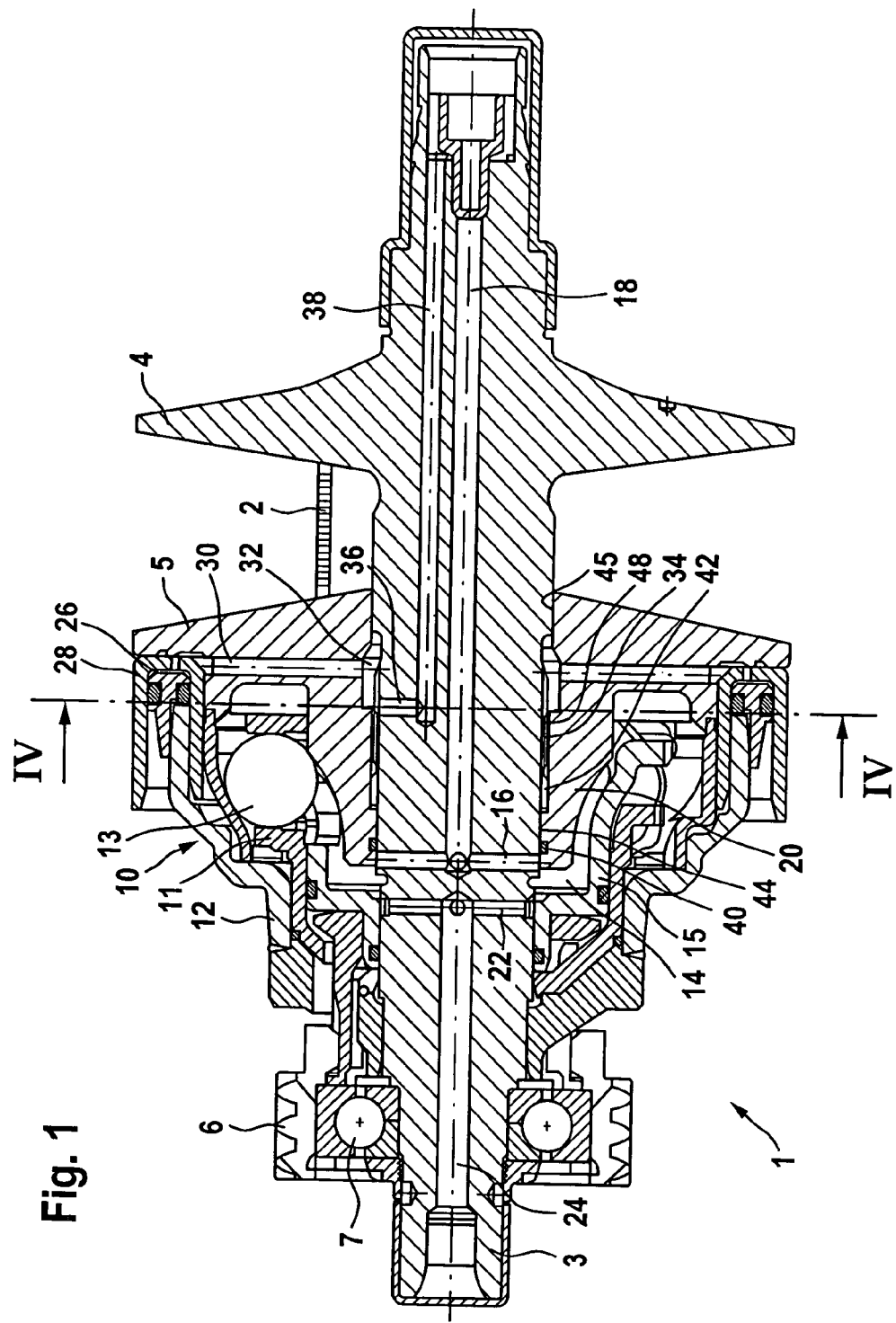
FIG. 1 is a longitudinal cross-sectional view of an embodiment of a belt-driven conical-pulley transmission in accordance with the present invention.

FIG. 1 shows a cross-sectional view of a portion of a belt-driven conical-pulley transmission, namely the input or driven side of the belt-driven conical-pulley transmission, which is designated in its entirety as 1 and which is driven by a drive engine, for example an internal combustion engine. In a fully implemented belt-driven conical-pulley transmission, assigned to the input-side part there is a complementarily designed output side part (not shown) of the transmission, the two parts being connected by an endless torque-transmitting means in the form of a plate-link chain 2, for example, for transmitting torque. Input side 1 of the belt-driven conical-pulley transmission includes a shaft 3 that is designed in the illustrated exemplary embodiment in a single piece with an axially stationary conical disk or fixed disk 4. The axially fixed conical disk 4 is positioned in the axial longitudinal direction of shaft 3 close to and opposite an axially repositionable conical disk or axially movable disk 5.

The torque provided by a drive engine (not shown) is introduced into the input side part of the belt-driven conical-pulley transmission shown in FIG. 1 by way of a gear 6 mounted on shaft 3. Gear 6 is supported on shaft 3 by means of a roller bearing in the form of a ball bearing 7 that absorbs axial and radial forces and is axially fixed on shaft 3. Between gear 6 and axially movable conical disk 5 is a torque sensor 10, which has an axially fixed spreader disk 11 that interacts with a spreading surface 19 formed directly on the sensor piston 15 through rolling elements in the form of balls 13.

In the condition illustrated in FIG. 1, axially movable disk 5 is at its most distant position from the fixed disk, i.e., the transmission is in underdrive.

A torque introduced through gear 6 results in a relative rotation between axially fixed spreader disk 11 and axially movable spreading surface 19 of sensor piston 15, which results in an axial movement to the right in accordance with the figure, due to sloping ramps along which the balls 13 run.

Torque sensor 10 also includes a pressure chamber 14, which is bounded by shaft 3, movable disk 5, and a sensor piston 15. Sensor piston 15 follows the axial motion of the balls 13. Its axial position thus depends upon the torque. An inflow bore 16 that is supplied with hydraulic fluid through a central axial bore 18 in shaft 3 opens into pressure chamber 14. In the illustrated underdrive position of the disk pair, the outlet of inflow bore 16 is not fully closed by the left edge of a flange 20 of movable disk 5, due to a large bevel.

Also opening into pressure chamber 14 is a discharge bore 22, which leads into an axial discharge channel 24 of shaft 3. The effective cross-sectional area at the radially outer opening of discharge bore 22 is influenced by the position of sensor piston 15. Overall, in the described arrangement the force exerted directly on sensor piston 15, and ultimately hydraulically on the axially movable disk, can be changed in a known way, depending upon the input torque and the transmission ratio.

Axially movable disk 5 is repositioned by an additional pressure chamber 26 that is formed between seal holder 12 and an annular cylinder 28 attached to axially movable disk 5. Pressure chamber 26 is supplied with hydraulic fluid via connecting channels 30 that extend through axially movable disk 5 from an annular chamber 32. Annular chamber 32 is formed between a recess in the inner surface of axially movable disk 5 or its flange 20 and the outer surface of shaft 3. Inside annular chamber 32 are axial teeth 34, by which axially movable disk 5 is non-rotatably but axially movably engaged with shaft 3. A connecting bore 36 formed in shaft 3 opens into annular chamber 32, by which annular chamber 32, and thus pressure chamber 26, can be subjected to control pressure that can be fed to an axial bore 38 in shaft 3 in the form of a blind bore 38. The control pressure applied to axial bore 38 to adjust the transmission ratio is controlled in a known manner by a control device, which subjects axially movable disk 5 to an adjusting pressure that is a function of the operating conditions of the motor vehicle, and is in addition to the pressure existing in the pressure chamber 14 that is a function of the input torque.

The transmission structure described above can be built compactly and is of known construction.

Because of their differing functions, pressure chambers 14 and 26, which must be charged with different pressures in many operating ranges, must be clearly separated from each other hydraulically. That is accomplished by means of a seal in the form of a sealing ring 40, for example, which seals between the left end region, as viewed in FIG. 1, of flange 20 fixed on the axially movable disk 5 and the outer surface of shaft 3.

As can be seen directly from FIG. 1, to the left side of the axial teeth 34 there is a dead-end region 42 of annular chamber 32 from which no hydraulic fluid can flow, because of seal 40. Guide surfaces 44 formed on the inside of flange 20 and the outside of shaft 3, which guide movable disk 5 axially and absorb the high tilting forces caused by the contact pressure of the plate-link chain, are as a result not lubricated by constantly replenished hydraulic fluid, so that heavy demands are placed on its condition in order to prevent fretting corrosion. Such fretting corrosion can particularly occur if there are present permanent gas bubbles that support corrosion, for example in the adjacent dead-end region 42.

Figure 2:
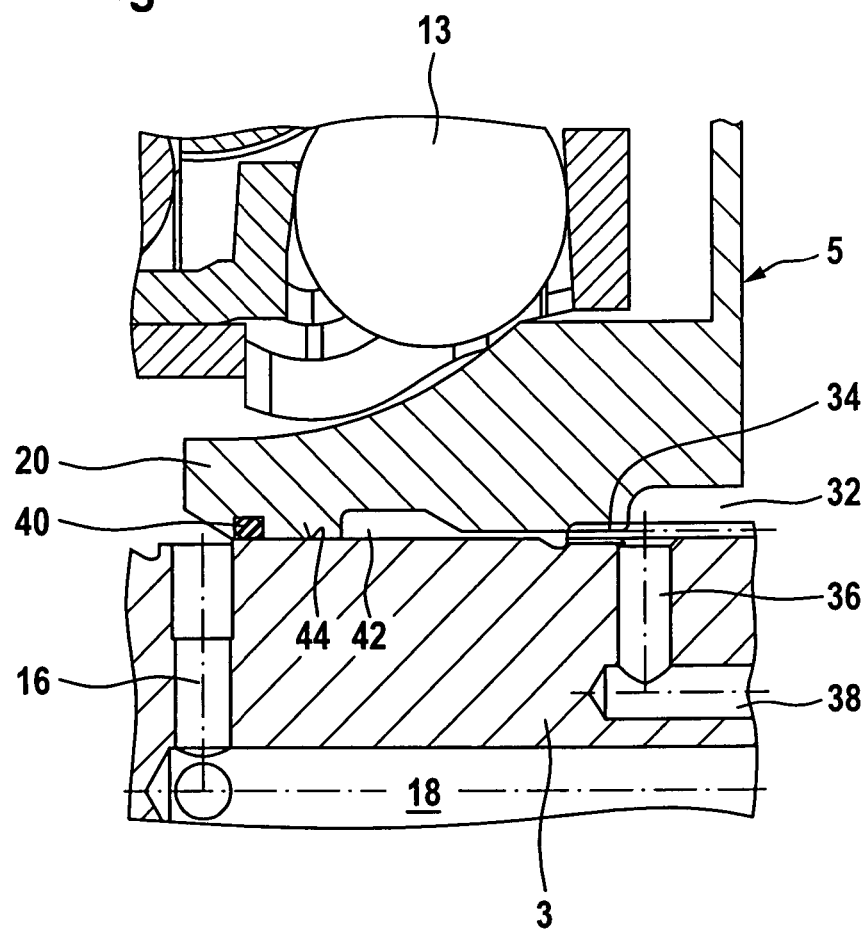
FIG. 2 is an enlarged view showing an embodiment of a discharge device in accordance with the present invention.

It is therefore expedient to provide annular chamber 32 with a discharge device for discharging air or gas bubbles. An example of such a discharge device will be explained below on the basis of FIGS. 2 through 4, where FIG. 2 shows an enlarged detail of a portion of FIG. 1, FIG. 3 shows only a enlarged part of the shaft visible in FIG. 2, and FIG. 4 shows an enlarged cross-sectional view through the shaft in the plane IV-IV of FIG. 1.

In accordance with the figures, connecting bore 36 opens into annular chamber 32 in the region of the axial teeth 34. That has the advantage not only of better lubrication of the teeth, but also has mechanical advantages over an opening of connecting bore 36 in the region of a recess to the right of teeth 34, as viewed in the drawing figures.

Figure 3:
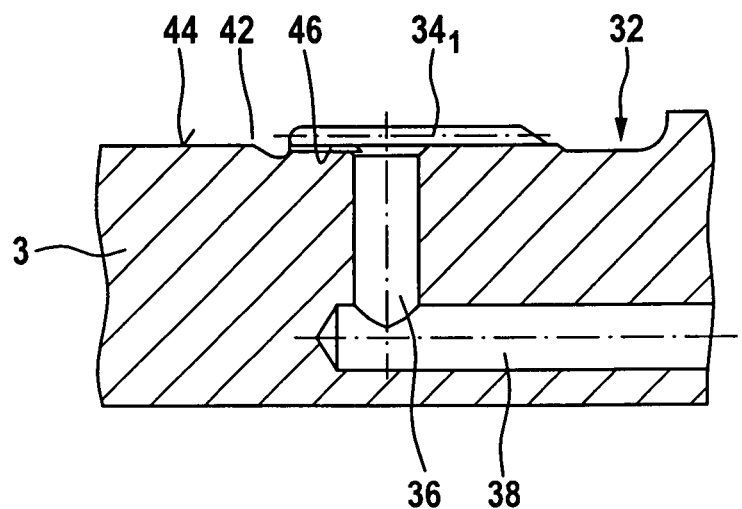
FIG. 3 is an enlarged detail of a portion of the structure shown in FIG. 2.
Figure 4:
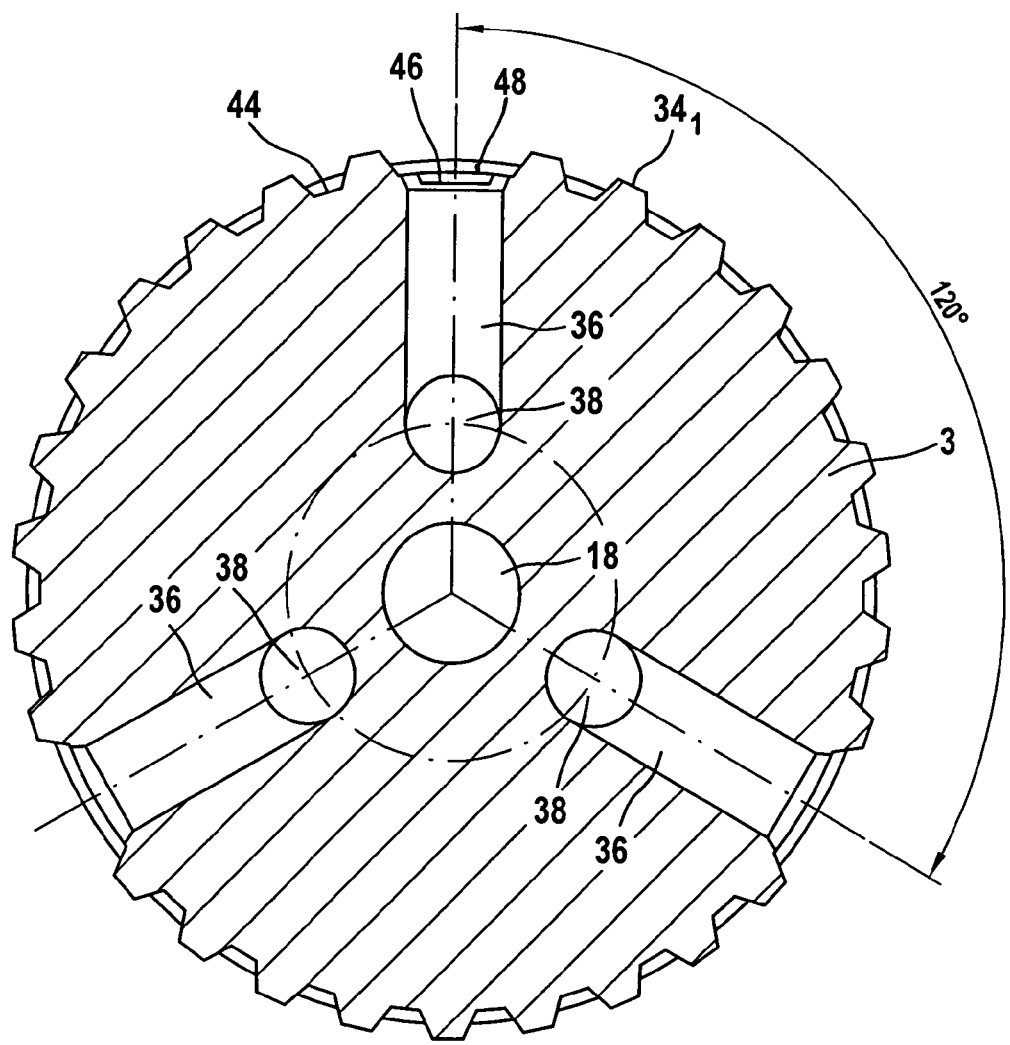
FIG. 4 is an enlarged cross-sectional view taken along the line IV-IV of FIG. 2.

As can be seen in particular from FIGS. 3 and 4, an axial groove 46 extends from the outlet of connecting bore 36 into the dead-end region 42 of annular chamber 32. Axial groove 46 is recessed relative to the base of the groove that extends between adjacent teeth $34_1$ of shaft 3, so that the base of axial groove 46 is deeper than the adjacent outer surface 44 of shaft 3, which forms one of the guide surfaces 44 in the longitudinal-side extension in the figures. Because the base of axial groove 46 is situated deeper than outer surface 44, any gas bubbles that might be in the dead-end region 42 move to the location in the annular chamber with the smallest diameter when the shaft turns, because of their lower specific weight than that of the hydraulic fluid, due to the "negative" centrifugal force; that is, they move to axial groove 46 and from there through connecting bore 36 and axial bore 38 and in that case out of the arrangement, by escaping into blind bore 38 at leakage locations in the rotating supply line for hydraulic fluid.

Guide surfaces 45 (see FIG. 1) are also formed to the right side of teeth 34 to guide axially movable disk 5 on shaft 3. But there is little or no danger of fretting corrosion there, since the guide surfaces are not sealed against each other (a small amount of hydraulic fluid can escape into the space between the two conical disks). But under some circumstances it can be advisable to also form on the right side of the outlet of connecting bore 36 an axial groove similar to the axial groove 46 shown in the drawing, particularly if a seal is also provided to prevent leakage at shaft 3 and along guide surface 45.

FIG. 4 shows a cross-sectional view of the arrangement. Clearly visible is axial groove 46, which is recessed below the tooth base, whose level is identified as 48. It is also clearly visible in FIG. 4 that a tooth of the axial teeth 34 of shaft 3 is missing in the region of connecting bore 36. In accordance with FIG. 4 there are three blind bores 38 with corresponding connecting bores 36 in shaft 3, with the teeth being absent in the vicinity of each outlet of a connecting bore 36. It goes without saying that the missing teeth do not have to be absent over the entire axial length, but only in the region that overlies the outlet of a connecting bore 36, or in the region along which axial groove 46 extends. In addition, in accordance with FIG. 4 axial grooves 46 can be provided at the outlets of all three connecting bores 36.

Figure 5:
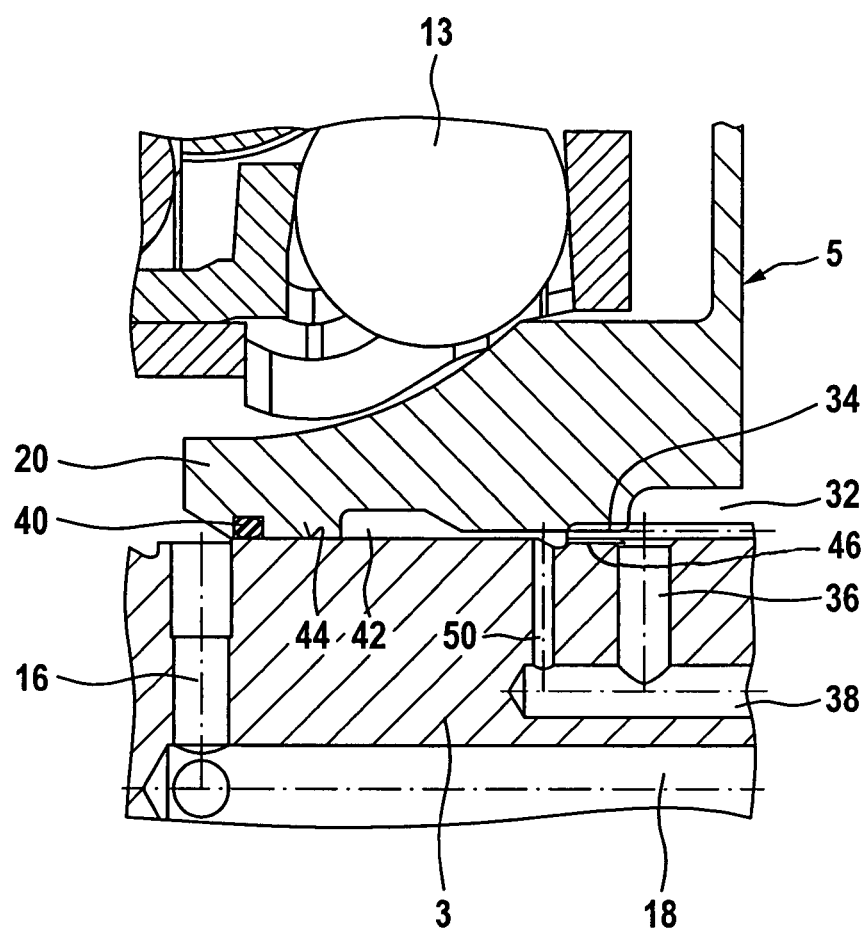
FIG. 5 is an enlarged detail view similar to that of FIG. 2, but of a modified embodiment of the present invention.

FIG. 5 is a view similar to FIG. 2, but of a modified embodiment. In that embodiment there is a discharge bore 50 separate from connecting bore 36, which extends from the bottom of dead end region 42, or advantageously from a circumferential groove recessed into the outer surface of the shaft. It goes without saying that the discharge bore 50 advantageously issues from a region of the dead-end region 42 that at least is not covered by seal 40 when the axially movable disk moves to the right to its position of furthest rightward displacement.

The described measures for removing gas bubbles from annular chamber 32, in particular from its dead-end region 42, can be employed individually or in combination. The number of axial grooves or discharge bores distributed around the circumference of the shaft is determined by the particular requirements. The depth of the recess of the base of axial groove 46 below the outer surface of shaft 3 is, for example, approximately 0.2 mm. It is also advantageous if, as shown, the toothed region of the shaft transitions to a slight indentation into the constant radius of the shaft outer surface to form a guide surface. It is also advantageous if the base of axial groove 46 is inclined toward the outlet of the respective connecting bore that leads into the axial bore 38 of shaft 3, for example by having the depth of the axial groove increase. Connecting bores 36 and discharge bore 50 do not have to extend radially, but can be inclined to the radial direction.

The invention can be employed advantageously wherever an annular dead-end chamber that is bounded by seating or guide surfaces is formed around a shaft of a belt-driven conical-pulley transmission.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A belt-driven conical-pulley transmission comprising: conical disk pairs on each of an input and an output side and carried on respective shafts, each disk pair including an axially fixed disk and an axially movable disk;
an endless torque-transmitting means interconnecting the input and output disk pairs for transmitting torque therebetween;
wherein at least one of the shafts includes at least one axial bore extending in the longitudinal direction of the at least one shaft, and at least one connecting bore extending from the at least one axial bore to the surface of the at least one shaft and having an outlet that is situated at a region of the shaft that is covered by the movable disk over its axial travel path,
an annular chamber formed between the movable disk and the at least one shaft and bounded at one axial end by a guide surface carried by the movable disk, wherein the annular chamber is located between the outer surface of the at least one shaft and a radially inner surface of the axially movable disk, wherein the annular chamber is subjected to hydraulic pressure through the at least one connecting bore and has a dead end region adjacent to the guide surface and spaced axially along the outer surface of the at least one shaft from the connecting bore, wherein the axially movable disk is connected to the at least one shaft by a plurality of interengaged, circumferentially spaced, axially extending teeth carried by the axially movable disk and by the at least one shaft, wherein adjacent axially extending teeth are separated by respective axial grooves to provide a rotationally fixed and an axially movable connection between the axially movable disk and the at least one shaft, wherein the axial teeth carried by the at least one shaft extend into the annular chamber, and the outlet of the connecting bore is positioned at a region of the at least one shaft containing the axial teeth, and at least one discharge passageway is provided for bleeding air bubbles from the annular chamber, wherein the at least one discharge passageway includes an axial discharge groove formed in the at least one shaft and that extends from the at least one connecting bore outlet to and for connection with the dead end region of the annular chamber, and the axial discharge groove has a base that is recessed relative to the outer surface of the at least one shaft and extends between a pair of adjacent axial teeth of the at least one shaft to allow air bubbles to escape from the dead end region to the connecting bore outlet to minimize fretting corrosion on a flange carried by the axially movable disk.

2. A belt-driven conical-pulley transmission in accordance with claim 1, wherein a region of the at least one shaft above the axial discharge groove and a region of the at least one shaft above the at least one connecting bore outlet are free of axial teeth.

3. A belt-driven conical-pulley transmission in accordance with claim 1, wherein a circumferential groove is provided in the at least one shaft between the connecting bore outlet and the dead end region of the annular chamber, and the circumferential groove has a base recessed relative to the outer surface of the least one shaft.

4. A belt-driven conical-pulley transmission in accordance with claim 1, wherein the dead end region of the annular chamber is sealed off on one axial end by a seal positioned between the at least one shaft and an axially extending flange of the axially movable disk, and the discharge passageway is situated at the annular chamber between the seal and the outlet of the at least one connecting bore.

5. A belt-driven conical-pulley transmission in accordance with claim 1, wherein the annular chamber is sealed off on two axially spaced ends by respective axially spaced seals positioned between the at least one shaft and an axially extending flange of the axially movable disk, and the discharge passageway is situated at the annular chamber between the axially spaced seals.

6. A belt-driven conical-pulley transmission in accordance with claim 1, including a connecting channel that extends through the axially movable disk from the annular chamber at an axial end of the annular chamber spaced from the at least one connecting bore and spaced from the at least one discharge passageway to a pressure chamber for applying hydraulic pressure against the axially movable disk.

7. A motor vehicle having a transmission in accordance with claim 1.

8. A belt-driven conical-pulley transmission in accordance with claim 1, including a plurality of circumferentially spaced axial discharge grooves, wherein the axial discharge grooves are positioned between respective circumferentially spaced pairs of axial teeth and extend between respective circumferentially spaced connecting bore outlets and the dead end region of the annular chamber.

9. A belt-driven conical-pulley transmission in accordance with claim 1, wherein the axial discharge groove is positioned on the at least one shaft at a location on the shaft surface where a shaft-carried axial tooth has been removed to provide the discharge passageway.

10. A belt-driven conical-pulley transmission in accordance with claim 1, wherein the shaft includes a plurality of circumferentially spaced connecting bores with respective axially extending teeth adjacent to openings of the connecting bores, and axial discharge grooves are positioned between circumferentially spaced pairs of axially extending teeth on the at least one shaft adjacent to the openings of respective connecting bores, and wherein axially extending teeth adjacent to a connecting bore are circumferentially spaced from each other a greater circumferential distance than others of the axially extending teeth carried by the at least one shaft.

* * * * *